Aug. 4, 1959    F. R. ABBOTT    2,898,589
HEMISPHERICAL ACOUSTIC PHASE COMPENSATOR
Filed April 20, 1954    2 Sheets-Sheet 1
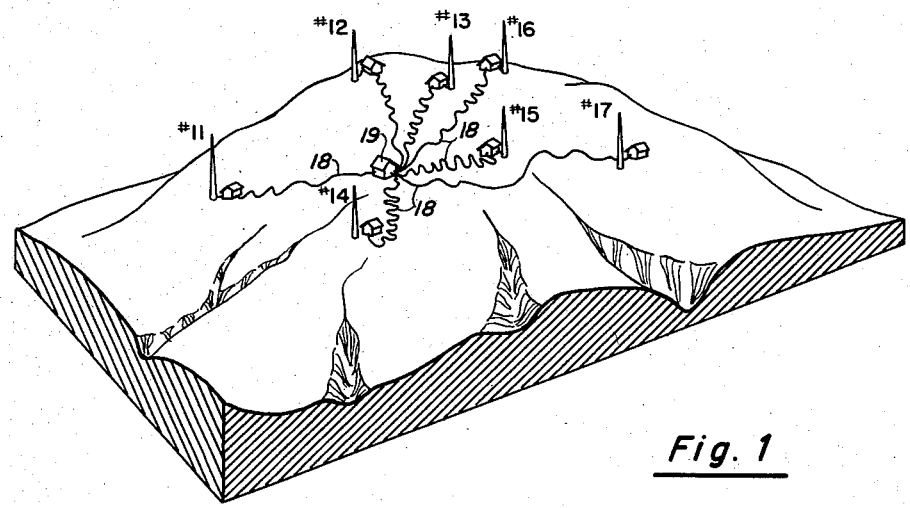
Fig. 1
Fig. 3
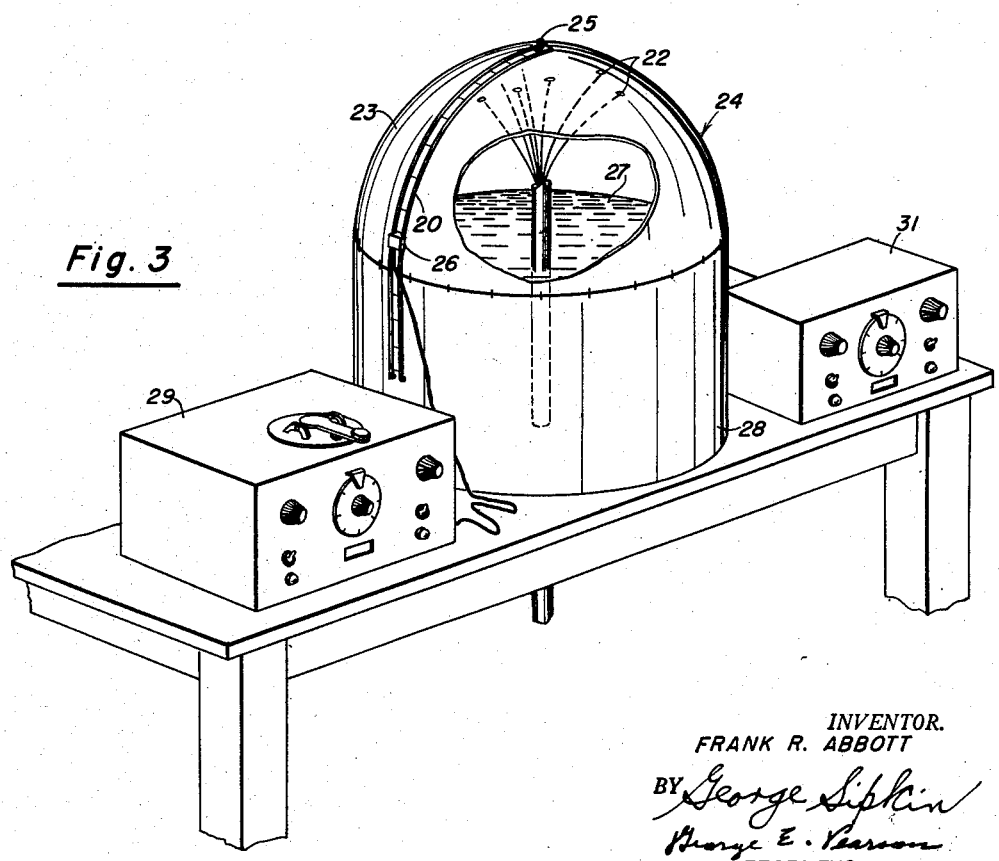
INVENTOR.
FRANK R. ABBOTT
BY George Sipkin
George E. Pearson
ATTORNEYS Aug. 4, 1959

F. R. ABBOTT 2,898,589

HEMISPHERICAL ACOUSTIC PHASE COMPENSATOR

Filed April 20, 1954

INVENTOR.
FRANK R. ABBOTT

BY George Sipkin
George E. Pearson
ATTORNEYS

United States Patent Office 2,898,589
Patented Aug. 4, 1959

2,898,589

HEMISPHERICAL ACOUSTIC PHASE COMPENSATOR

Frank Riley Abbott, San Diego, Calif.

Application April 20, 1954, Serial No. 424,529

19 Claims. (Cl. 343—113)

(Granted under Title 35, U.S. Code (1952), sec. 266)

The invention described herein may be manufactured and used by or for the Government of the United States of America for governmental purposes without the payment of any royalties thereon or therefor.

The present invention relates to apparatus for compensating for the time delay between signals transmitted or received by a field array of antennae or acoustical transducers in both prearranged grouping and disorderly arrangement and more particularly to a hemispherical acoustic phase compensator of the metallic shell type for fixed arrays of electromagnetic or acoustic radiators or receivers.

Existing methods and apparatus for accomplishing the objective of the present invention require cumbersome and costly electrical delay lines, complicated switching mechanisms, and an excessive number of moving parts for continuous scanning operation. However, existing techniques are suitable for listening at all frequencies simultaneously whereas the present invention operates on one or several discrete frequencies as desired.

The present invention is a device for accomplishing proper phasing of large arrays of radiating or signal sensing devices in such manner that the directive gain of the system is the maximum attainable for such an array. When used as part of a receiving system the device can determine the direction of a signal source, the frequency spectrum and the distance to the source.

The present invention constitutes a device which attains greater efficiency for distant elements of radiation array, is simpler to operate, less costly to construct, requires less space and provides frequency spectral information not available with conventional devices.

An object of the present invention is the provision of a device with a minimum of moving parts for enabling azimuthal scanning by phase control for a large complex immovable array of antennae or acoustic transducers in electromagnetic or acoustic radiating or receiving systems.

Another object of the present invention is the provision of a device for accomplishing rapid beam scanning with an arbitrarily large and complex array of elements.

Another object of the present invention is the provision of a device which will serve as a passive range finder when used in connection with shipborne hydrophone arrays.

Another object of the present invention is the provision of a device which will serve as a spectrometer when used with orderly arrays of antennae.

A further object is the provision of a device by which highly directional beams can be accomplished without physical motion of the elements forming the beam, at frequencies such that the conventional fractional wave spacing between beam forming elements establishes an impractical size on a multi-element system.

A further object of the present invention is the provision of a device to be used in a phasing system for directive radiation from a disordered array of radiating elements and which may be applied to directive underwater sound listening at very low frequency, which may be applied to beamed radio transmission at very low frequency, which may be used as an acoustic spectrometer, and which may be used in a system for determining the distance from an array to the sound source.

Other objects and many of the attendant advantages of this invention will be readily appreciated as the same becomes better understood by reference to the following detailed description when considered in connection with the accompanying drawings wherein:

Fig. 1 shows a pictorial view of a typical antenna arrangement;

Fig. 3 shows an enlarged pictorial view of the hemispherical acoustic phase compensator with a portion of the shell broken away to show its interior.

Figure 2:
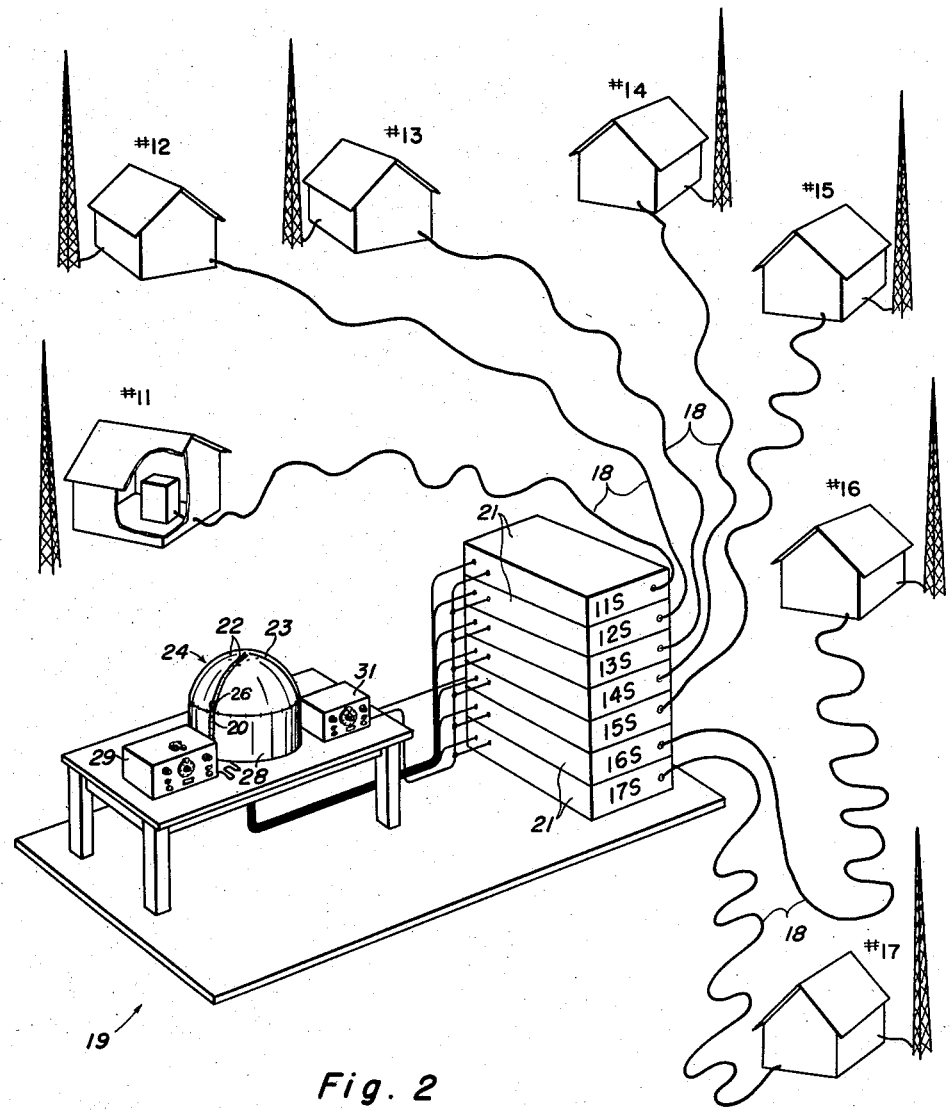
Fig. 2 shows a schematic arrangement of a beam radiating system.

Referring now to the drawings wherein like reference characters designate like or corresponding parts, there is shown in Fig. 1 a typical antenna array, in this instance comprising seven antennae, 11, 12, 13, 14, 15, 16, 17, each having its own transmitter or receiving amplifier (not numbered) and transmission lines 18 of equal length leading into the central control house 19 and connected to the single side band selector rack 21 at points 11S, 12S, 13S, 14S, 15S, 16S, and 17S, respectively, as shown in Fig. 2. The signals at this point are then heterodyned with the signal from a local oscillator 31 to yield new signals having the same phase characteristics of the old signals but at a new frequency enabling wave similitude to exist between the original array and the replica later described. From the selector rack 21 suitable electrical connections are made to replica transducers 22 mounted on the shell portion 23 of the hemispherical acoustic phase compensator 24. These transducers 22 are mounted on shell 23 as a miniature replica of the antenna array shown in Fig. 1. Each antenna has a corresponding transducer on the shell spaced from the other transducers in proportion to the spacing of the antennae from each other. The miniature replica of transducers is mounted in the polar region surrounding pole 25 of the shell 23, the material of the shell being characterized by low acoustic loss. A small scanning element 26 is arranged in any suitable manner for movement along a calibrated track 20 which conforms to the surface of shell 23 and the cylindrical shell 28 depended therefrom. Track 20 is pivotally secured to shell 23 at pole 25 and thus may move around the shell 23 in reference to the calibrated equatorial circumference of the sphere which is located at 90° from pole 25 which represents the center of the miniature replica. This scanning element 26 in a receiving system drives an amplifier, not shown, exciting a suitable presentation unit such as, for example, an oscilloscope or chart recorder also not shown. If the system is for beamed transmission, then a signal is fed to the scanning element 26. The miniature replica of transducers 22 receives signals from the scanning element 26 in proper phase for the full scale array of antennae in the field. Sideband selectors 11S, 12S, 13S, 14S, 15S, 16S, and 17S add a local oscillator signal and yield the proper signal for the full scale array. It is also within the purview of this invention to use step scanning with a switch, utilizing small fixed transducers along the circumference instead of using scanning element 26.

The hemisphere shell 23 should extend below the scanning circumference into a medium 27 such as oil to absorb the sonic energy and thus eliminate reflection from the edge. This may be done by making the hemisphere the end of cylindrical shell 28 as typified by a conventional butane storage tank. The cylindrical section 28 is heavily coated by some effective sound absorber such as rubber or suitable synthetic loaded with powdered metal, not shown in the drawings.

The link between an element of the full size system and the corresponding element in the miniature system involves an amplifier and a frequency converter maintaining proper phase. This may be of the type well known in the art, typically described by Oswald G. Villard, IRE Proceedings, vol. 40, pp. 334–338 of March 1952. Such a selector receives a signal of the form $S_1 = A \cos(\omega t + \delta)$ in which A is the amplitude, $\omega$ (omega) the angular frequency, $t$ the time coordinate and in which $\delta$ (delta) is a phase correction associated with a beam direction $\phi$ (phi) and is expressible $\delta$ (delta) $= 2\pi/\lambda D \cos(\phi - \alpha)$ where D is the distance from a reference point, $\alpha$ (alpha) the azimuth of the element from the point and line of reference, and $\lambda$ (lambda) is the wave length of the incident signal. Each selector also receives from a common signal oscillator 31 a second signal of angular frequency $N\omega$ with amplitude B expressed in the form $S_2 = B \cos(N\omega)t$. The selector output is of the form $S_3 = AB \cos [(n+1)\omega t + \delta]$. Thus the important phase difference $\delta$ can be carried over to miniature replica 22. The process is also reversible so that if frequency reduction is desired as in the case of reception by an electromagnetic antenna array, the proper phase can still be provided to the miniature replica transducers 22. For electromagnetic systems the frequency is greatly increased while for underwater sound the frequency to the radiating ensemble is greatly reduced. For convenience in assembly, computations and operation, it is desirable that the frequency employed in the miniature acoustic replica 22 be so related to that of the full size field array that the spacing of the elements in wave lengths may be maintained. Since this selector is not part of the invention per se but is merely used in conjunction therewith, further examination of the selector is not considered necessary.

*Operation*

In application of the hemispherical acoustic phase compensator to directive underwater sound listening at very low frequency when it is desired to accomplish highly directive listening from hydrophones most appropriately placed on an elevated structure, let the highest frequency desired be 44 cycles, for which a half wave length in water becomes 12½ feet. Place the hydrophones in a triangular pattern with 12½ foot sides on the surface of the elevated structure. Obtain a ¼₀₀th scale projection of the hydrophone pattern on a horizontal plane. Select a centermost element as a reference point and position it at the pole 25 of a 30 inch diameter steel hemisphere and project the scaled down hydrophone pattern onto the sphere. Only negligible error in circumferential spacing between elements arises in deforming the plane projection onto the spherical surface. 1/16" miniature sound transducers are then inserted or affixed to each scaled down position of the hydrophones on the metal hemisphere. Additional transducers are now affixed at intervals along the equatorial circumference of the sphere or, in the alternative, a single scanning element 26 is provided which moves along the equator. Each hydrophone is now made to modulate with a local oscillator through a single side band signal selector which delivers at its output a signal proportional in level to the hydrophone and at a higher frequency, and the phase, or time delay, of signals is still maintained. For example, since the longitudinal wave velocity of sound in steel is 3⅓ times that in water and the scaling factor is 400, the single side band output must be $400 \times 3\frac{1}{3} \times S$, hydrophone signal frequency. (A thirty cycle signal at the hydrophone would yield a 180 kc. signal out of the selector and to the miniature replica of transducers 22.) The plane wave front passing pole 25 is in focus at a point on the equator defined by the plane normal to the wave front and passing through the pole 25. When the scanning transducer 26 passes this point the signals are in focus and are so shown on a suitable presentation unit, i.e., oscilloscope or chart recorder.

Several variations and modifications of the above procedure are possible. For instance, each hydrophone may drive a carrier suppressed balanced modulator and both side bands be fed to the miniature transducers 22. Also the excitation of transverse waves in the hemispherical shell might be preferred since a thinner shell may be used, although the carrier frequency in this case does not vary linearly with listening frequency since the velocity of transverse waves is dependent on the frequency.

In application of the invention in a beamed radio transmission system at very low frequency it is desired to locate radio antennae on a rocky island about a half mile across, with frequencies of transmission being in the 100 to 300 kc. band. A half-wave separation at the maximum frequency becomes 500 meters. Accordingly, seven towers are constructed as shown in Fig. 1 with spacings as near to 500 meters as the topography makes practicable. Transmitters are placed in small buildings at the base of the towers and are excited through equal length coaxial transmission lines 18 from the single side band selectors 11S, 12S, 13S, 14S, 15S, 16S, 17S, mounted in the central control house 19. The side band selectors are fed by two signals as shown in Fig. 2, one signal being fed in common to all selectors from a master oscillator 31 and the second signal is supplied from transmitting modulator 29 to transducer 26 and hence to each individual selector from its corresponding transducer in the miniature array 22 on the shell 23 of the acoustic phase compensator 24. In this application the latter is a thin walled brass sphere one foot in diameter and the bottom half is coated with electrician's rubber tape as a wave absorber. Small transducers 22, flat barium titanate discs 1/16" thick and 1/8" diameter, are cemented to the sphere near the polar axis 25 in positions to simulate the antennae positions at 1/20,000th size. Each transducer is cable connected to its corresponding side band selector unit as shown in Fig. 2 and Fig. 3. Similitude demands that the spacing in wave lengths between the transducer elements and the antennae be held invariant. Thus, if $d$ designates spacing of a pair of transducers on the sphere and D the spacing of the corresponding pair of antennae while the wave lengths for the acoustic wave in the shell and the radio waves are $\lambda_s$ and $\lambda_r$ respectively, then $d/\lambda_s = D/\lambda_r$. The wave lengths are also expressible as phase velocity V over frequency $f$, so using the same subscripts we have $$d/\frac{Vs}{fs} = D/\frac{Vr}{fr}$$

From this the acoustic frequency $fs$ for excitation of the transducer array 22 is $fs = fr D/d \, Vs/Vr$. Since the scaling factor $D/d$ was established as 20,000 and the ratio of transverse acoustic velocity $Vs$ in brass to radio wave velocity is about $$\frac{3000}{3 \times 10^8}$$

or $10^{-5}$, then the acoustic frequency becomes $$fs = fr \times 20,000 \times 10^{-5} = 0.2 \, fr$$

The 100 to 300 kc. radio band is thus properly simulated by a 20 to 60 kc. audio signal. This audio signal is now applied to the shell by the scanning transducer 26. The longitudinal position of the transducer prescribes the azimuth of the beam generated by the co-phasing of the RF signals from the antennae array. The scanning transducer 26 is the only part of the system moving with the radiating beam.

In the application of this invention in a phase compensating system in which the receivers are restricted to a plane, three dimensional beamed scanning may be accomplished.

If the frequency multiplication is correct between full scale elements and the miniature replica providing phase information, then the major lobe of the directivity pattern is horizontal. However, if the frequency reduction between the replica and the full scale array is less than the scaling factor, the horizontal lobe is split into an elevated lobe and its depressed image. Thus a stack of horizontal full scale arrays can be progressively phased to obtain three dimensional beamed scanning.

If an orderly array of hydrophones and a corresponding scale replica on the hemisphere are driven at frequencies such that the spacing of transducers on the latter exceeds a wave length, then the system becomes an acoustic spectrometer. For example, assume a line array of hydrophones is excited by a sound source whose frequency makes the array spacing equal to a half wave length. If the proper frequency multiplication is given the scale replica on the hemisphere, then the points of focus on the hemisphere are properly in line with the scale array. However, if the heterodyne oscillator generates roughly twice the proper frequency to the miniature array, then four lobes appear at polar angles ±30° and ±150° with respect to the line of the array. Other frequencies present in the received signal appear in orderly positions about the circumference of the hemisphere.

In instances of very precise transfer of phase from the full scale field array to the miniature replica it is possible to determine the distance to the sound source. Since the geometrical aberration of the hemisphere is very slight, the focal spot for plane waves is sharply defined on the circumference of the hemisphere. If the sound source is near enough that the curvature of the wave front is appreciable, then the focal spot moves below the circumference of the hemisphere. Thus a roving pickup element 26 with a calibrated scale of displacement beyond the 90° great circle such, for example, as the calibration on track 20 can be used to provide valuable range information.

Obviously many modifications and variations of the present invention are possible in the light of the above teachings. It is therefore to be understood that within the scope of the appended claims the invention may be practiced otherwise than as specifically described.

What is claimed is:

1. In combination with a field array of energy sensing elements, a spherical shell having transducers mounted thereon connected to said elements for generating waves within said shell in response thereto, and means attached to said sphere in physical contact with the surface thereof and adapted to traverse said surface for determining the resultant focal point of said waves.

2. In combination with a field array of energy sensing elements, a spherical shell having transducers mounted thereon in miniature replica of the positions of said field array, each transducer being individually connected to its corresponding element in the array and responsive thereto, means including at least one transducer attached to said spherical shell in physical contact with the surface thereof and adapted to traverse said surface for scanning said shell and determining the focal point of waves within the sphere resulting from the response of said transducers in replica to said elements.

3. In combination with a field array of energy sensing elements, a spherical shell having transducers mounted thereon in miniature replica of the positions of said elements in the field array and respectively connected to said elements and responsive thereto, means attached to said sphere and movable along the equatorial circumference in physical contact with the surface thereof for determining the focal point of waves within the sphere generated by said transducers in response to said elements.

4. In combination with a field array of energy sensing elements, a spherical shell having transducers mounted thereon connected to said elements and responsive thereto, means attached to said sphere in physical contact with the surface thereof and adapted to traverse said surface for determining the resultant focal point of waves within the sphere, and calibration indicia means showing the relationship of the distance of said focal point from said equatorial zone with respect to the distance of said energy source from a predetermined reference point in said field array.

5. In combination with a field array of energy sensing elements, a spherical shell with transducers mounted thereon connected to said elements and responsive thereto, driving means for said elements and said transducers, and means attached to the surface of said sphere and adapted to traverse said surface for determining the focal points of waves within the sphere resulting from the response of the transducers to said elements, whereby, when said elements and transducers are driven at such frequencies that the spacing between the transducers exceeds one wave length, the apparatus may be used as an acoustic spectrometer.

6. In combination with a field array of energy sensing elements, a spherical shell having transducers mounted thereon in miniature replica of the positions of said field array, each transducer being individually connected to its corresponding element in the array and responsive thereto, means for maintaining the same phase relationship between the transducers as the phase relationship between the field elements, and means for scanning said spherical shell including a transducer maintained in physical contact with said shell and adapted to traverse the surface thereof for determining the focal point of waves within said sphere resulting from the response of said transducers in replica to said elements.

7. In combination with a field array of energy sensing elements, a spherical shell having transducers mounted thereon in miniature replica of the positions of said field array, each transducer being individually connected to its corresponding element in the array and responsive thereto, means for absorbing the waves within the sphere, and means for scanning said sphere for determining the focal point of said waves within said sphere resulting from the response of said transducers in replica to said elements.

8. In combination with a field array of energy sensing elements, a spherical shell with transducers mounted thereon in miniature replica of the positions of said field array, each transducer being individually connected to its corresponding element in the array and responsive thereto, the lower half of the interior surface of said shell being of wave absorbent material for absorbing the waves within the sphere, and means for scanning said sphere for determining the focal point of said waves within said sphere resulting from the response of said transducers in replica to said elements.

9. In combination with a field array of energy sensing elements, the upper portion of a spherical shell with transducers mounted thereon in miniature replica of the positions of said field array and connected to said elements, each transducer individually connected to its corresponding element in the array and responsive thereto, a cylindrical container having said shell portion extending downwardly therein, a fluid in said cylinder serving to absorb the waves within the shell, and means for scanning said shell for determining the focal point of said waves within said shell resulting from the response of said transducers in replica to said elements.

10. In combination with a field array of energy sensing elements, a hemispherical shell with transducers mounted thereon in miniature replica of the positions of said field array and connected to said elements, each transducer individually connected to its corresponding element in the array and responsive thereto, means for absorbing the waves within the shell comprising a closed cylindrical portion extending downwardly therefrom and containing a wave absorbent fluid, and means for scanning said sphere for determining the focal point of said waves within said sphere resulting from the response of said transducers in replica to said elements.

11. In combination with a field array of energy sensing elements, a spherical shell having transducers mounted thereon connected to said elements for generating waves within said shell in response thereto, said shell being constructed of a material of low acoustic loss, and means attached to said sphere in physical contact with the surface thereof and adapted to traverse said surface for determining the resultant focal point of said waves.

12. In combination with a field array of energy sensing elements, a spherical shell having transducers mounted thereon connected to said elements for generating waves within said shell in response thereto, and comprising a track conforming to the surface of the shell and pivotally secured to the shell at the polar point, said track being adapted to circumvent the shell and carry a scanning element adapted to move along said track in contact with the spherical shell.

13. In combination with a field array of energy sensing elements, a spherical shell having transducers mounted thereon in miniature replica of the positions of said field array, each transducer being individually connected to its corresponding element in the array through an amplifier and a frequency converter for maintaining the proper phase and responsive thereto, means including at least one transducer for scanning said sphere for determining the focal point of waves within the sphere resulting from the response of said transducers in replica to said elements.

14. In combination with a field array of energy sensing elements, a spherical shell, mechanical acoustic means mounted on said shell in miniature replica of the positions of said field array for producing sound waves within the shell in phase with the waves exciting the corresponding elements of the field array, and means attached to said shell in physical contact with the surface thereof and adapted to traverse said surface for determining the resultant focal point of said sound waves within the shell.

15. An apparatus for determining the direction of the source of energy within a predetermined frequency range comprising a plurality of spaced antennas for detecting said energy, an array of receiving points positioned in a spherical shell in miniature replica of the spaced antennas, means for transposing the energy into a plurality of electrical impulses and transmitting said impulses to said miniature array of receiving points, means for transposing said electrical impulses into acoustic waves within the spherical shell at said receiving points and in the same phase relationship, and means for determining the point at which the acoustic waves are in focus whereby said point is indicative of the direction of said energy source.

16. An apparatus for determining the distance of the source of energy within a predetermined frequency range comprising a plurality of spaced antennas having a pre-established reference line, for detecting said energy, an array of receiving points positioned in a spherical shell in miniature replica of the spaced antennas, means for transposing the energy into a plurality of electrical impulses and transmitting said impulses to said miniature array of receiving points, means for transposing said electrical impulses into acoustic waves within the spherical shell at said receiving points and in the same phase relationship, and means for determining the point with respect to said pre-established reference line at which the signal waves are in focus whereby said point is indicative of the distance of said energy source from said spaced points.

17. An apparatus for accomplishing three dimensional scanning of signals within a predetermined frequency range comprising means for detecting said signals at a plurality of stacks of listening stations, means for transforming the signal waves received by listening stations in a single plane into electrical impulses, an array of receiving points positioned in a spherical shell in miniature replica of the listening stations, means for transposing said electrical impulses into acoustic waves within the spherical shell at said receiving points as a replica of energy detected at said stacks, means for determining the point at which the acoustic waves are in focus whereby said point is indicative of the direction of said energy source in each respective stack, and means for detecting and comparing the relative strength of signals at the focal points of a series of stack locations for determining the elevation angle of the source of said signals.

18. An apparatus for determining the frequency of a source of energy comprising means for detecting signals indicative of said energy at a plurality of spaced stations, means for transmitting said signals to a receiving station and generating a local frequency at said station, means for heterodyning said local frequency with the received signal whereby a plurality of side band signals at a predetermined side band frequency having the same phase relationship as said received signals are produced, an array of receiving points positioned in a spherical shell in miniature replica of the spaced stations, means for converting said side band signals into acoustic waves within said spherical shell from spaced points located within a polar region and simulating therein the spacing of said plurality of stations thereby to simulate said source at the receiving station, said predetermined side band frequency having a wavelength less than the spacing between said points, and means for locating the focal point of said acoustic waves on the spherical shell and measuring the frequency of said source in terms of the polar angle of said focal point.

19. An apparatus for determining the frequencies resident in a source of radiant energy comprising means for detecting said energy at a plurality of spaced stations, means for converting the detected energy signals into electrical impulses and transmitting said impulses to a receiving station, means for generating a local frequency and heterodyning it with said electrical impulses to derive therefrom a plurality of signals at predetermined side band frequencies and having the same phase relationship as said impulses, an array of receiving points positioned in a spherical shell in miniature replica of said spaced stations, means for converting said side band signals into acoustic waves in the spherical shell from spaced points located within a polar region and simulating therein the spacing of said plurality of stations thereby to simulate said source at the receiving station, said side band frequencies having wave lengths less than the distance between said points, means for locating the focal points of said acoustic waves on the spherical shell and indicating the source frequencies in terms of the polar angles of said focal points.

References Cited in the file of this patent

UNITED STATES PATENTS

| | | |
|---|---|---|
| 1,470,733 | Hayes | Oct. 16, 1923 |
| 1,863,716 | Hecht | June 21, 1932 |
| 2,234,654 | Runge | Mar. 11, 1941 |
| 2,407,649 | Budenbom | Sept. 17, 1946 |
| 2,566,703 | Iams | Sept. 4, 1951 |

FOREIGN PATENTS

| | | |
|---|---|---|
| 310,874 | Germany | Feb. 8, 1919 |
| 399,796 | Germany | July 29, 1924 |
| 369,360 | Great Britain | Mar. 24, 1932 |